(12) United States Patent
Ka et al.

(10) Patent No.: US 12,261,322 B2
(45) Date of Patent: *Mar. 25, 2025

(54) ELECTROCHEMICAL DEVICE SEPARATOR INCLUDING POROUS ORGANIC/INORGANIC COMPOSITE COATING LAYER AND ELECTROCHEMICAL DEVICE INCLUDING SAME

(71) Applicant: LG ENERGY SOLUTION, LTD., Seoul (KR)

(72) Inventors: Kyung Ryun Ka, Daejeon (KR); Min Ji Kim, Daejeon (KR); Seung Hyun Lee, Daejeon (KR); Dong Wook Sung, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/562,584

(22) PCT Filed: Feb. 23, 2023

(86) PCT No.: PCT/KR2023/002570
§ 371 (c)(1),
(2) Date: Nov. 20, 2023

(87) PCT Pub. No.: WO2023/243806
PCT Pub. Date: Dec. 21, 2023

(65) Prior Publication Data
US 2024/0332736 A1 Oct. 3, 2024

(30) Foreign Application Priority Data
Jun. 15, 2022 (KR) .................. 10-2022-0072646

(51) Int. Cl.
*H01M 50/451* (2021.01)
*H01M 10/052* (2010.01)
(Continued)

(52) U.S. Cl.
CPC ....... *H01M 50/451* (2021.01); *H01M 10/052* (2013.01); *H01M 50/403* (2021.01);
(Continued)

(58) Field of Classification Search
CPC ............ H01M 50/451; H01M 50/446; H01M 50/449; H01M 50/426; H01M 50/42
See application file for complete search history.

(56) References Cited

U.S. PATENT DOCUMENTS

2017/0331094 A1* 11/2017 Lee .................. H01M 10/0525
2019/0051906 A1* 2/2019 Rhee ......................... C01F 7/02
(Continued)

FOREIGN PATENT DOCUMENTS

| JP | WO2014/103791 A | 1/2017 |
| JP | 2017-152268 A | 8/2017 |

(Continued)

OTHER PUBLICATIONS

International Search Report (PCT/ISA/210) issued in PCT/KR2023/002570 mailed on Jun. 15, 2023.

*Primary Examiner* — Jeremiah R Smith
(74) *Attorney, Agent, or Firm* — Birch, Stewart, Kolasch & Birch, LLP

(57) ABSTRACT

An electrochemical device separator including a porous polymer substrate and a porous organic/inorganic composite coating layer on at least one surface of the porous polymer substrate. The porous organic/inorganic composite coating layer includes particulate binder polymers, a non-particulate acrylic-containing polymer, and first inorganic particles. The particulate binder polymers include hybrid polymer particles (Continued)

including a fluorine-containing polymer and an acrylic-containing polymer, and acrylic-containing polymer particles. The acrylic-containing polymer particles have a particle size D50 (a) in a range of 1 μm to 7 μm, the first inorganic particles have a particle size D50 (b) in a range of 200 nm to 800 nm, a/b is in a range of 2 to 15, and hybrid polymer particles have a particle size D50 less than 250 nm.

20 Claims, 1 Drawing Sheet

(51) Int. Cl.
 *H01M 50/403* (2021.01)
 *H01M 50/42* (2021.01)
 *H01M 50/426* (2021.01)
 *H01M 50/446* (2021.01)
 *H01M 50/449* (2021.01)
(52) U.S. Cl.
 CPC ......... *H01M 50/42* (2021.01); *H01M 50/426* (2021.01); *H01M 50/446* (2021.01); *H01M 50/449* (2021.01)

(56) References Cited

U.S. PATENT DOCUMENTS

| | | | | |
|---|---|---|---|---|
| 2019/0260001 | A1* | 8/2019 | Gu | H01M 10/052 |
| 2020/0075910 | A1* | 3/2020 | Kim | H01M 50/426 |
| 2020/0127264 | A1* | 4/2020 | Kim | H01M 50/457 |
| 2020/0235400 | A1* | 7/2020 | Sakai | C09J 7/385 |
| 2021/0119215 | A1 | 4/2021 | Ito et al. | |
| 2021/0135316 | A1* | 5/2021 | Sung | H01M 50/446 |
| 2021/0184311 | A1* | 6/2021 | Lefebvre | H01G 9/02 |
| 2021/0184314 | A1* | 6/2021 | Jang | H01M 50/42 |
| 2022/0029244 | A1* | 1/2022 | Kim | H01M 50/411 |
| 2022/0311098 | A1* | 9/2022 | Liu | C09J 127/20 |
| 2024/0039119 | A1* | 2/2024 | Ka | H01M 50/451 |
| 2024/0141198 | A1* | 5/2024 | Beaume | H01M 50/446 |

FOREIGN PATENT DOCUMENTS

| | | |
|---|---|---|
| JP | 2018-530860 A | 10/2018 |
| JP | WO2018/008263 A | 12/2018 |
| JP | 2020-522097 A | 7/2020 |
| JP | 2021-513190 A | 5/2021 |
| KR | 10-2013-0093977 A | 8/2013 |
| KR | 10-1472848 B1 | 12/2014 |
| KR | 10-2017-0138957 A | 12/2017 |
| KR | 10-2018-0037617 A | 4/2018 |
| KR | 10-2016-0048697 A | 5/2018 |
| KR | 10-2019-0004158 A | 3/2019 |
| KR | 10-2019-0083910 A | 7/2019 |
| KR | 10-2019-0128440 A | 11/2019 |
| KR | 10-2020-0026595 A | 3/2020 |
| KR | 10-2020-0081442 A | 7/2020 |
| KR | 10-2020-0082480 A | 7/2020 |
| KR | 10-2022-0024180 A | 3/2022 |
| KR | 10-2022-0011097 A | 12/2024 |
| WO | WO2020/263804 A1 | 12/2020 |
| WO | WO2022/110228 A1 | 6/2022 |

* cited by examiner

[Fig. 1]
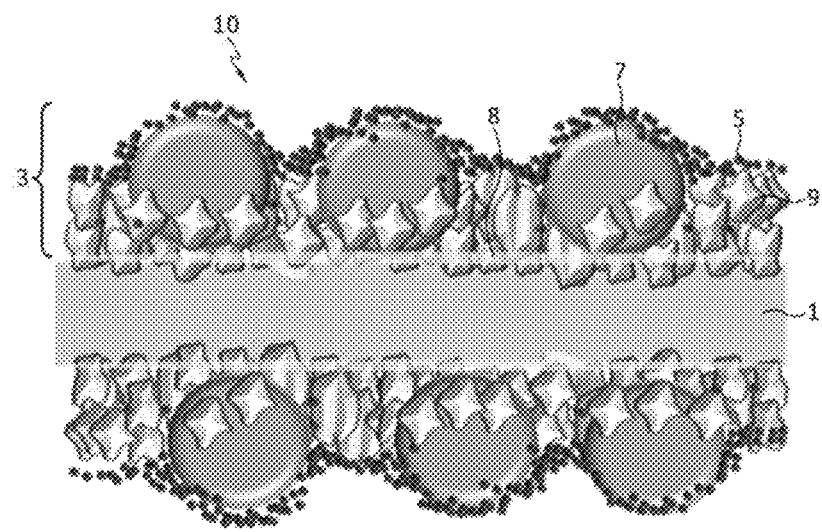
[Fig. 2]
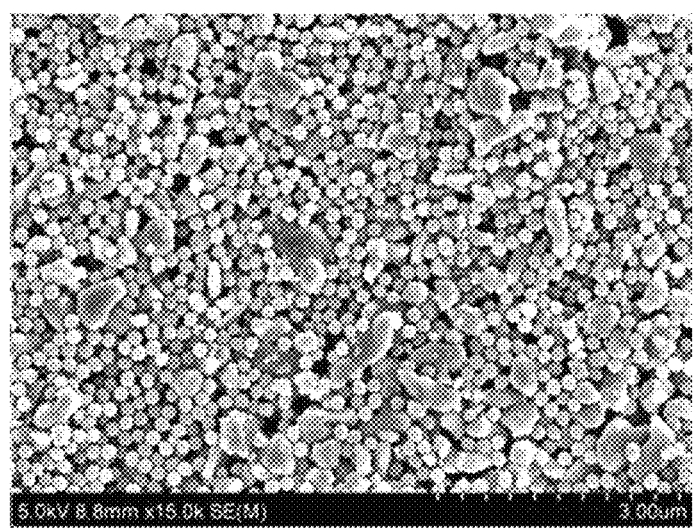

ELECTROCHEMICAL DEVICE SEPARATOR INCLUDING POROUS ORGANIC/INORGANIC COMPOSITE COATING LAYER AND ELECTROCHEMICAL DEVICE INCLUDING SAME

The present application claims priority to Korean Patent Application No. 10-2022-0072646, filed Jun. 15, 2022, the entire contents of which is incorporated herein for all purposes by this reference.

BACKGROUND OF THE INVENTION

1. Field of the Invention

The present disclosure relates to an electrochemical device separator having improved a compression resistance, an adhesive strength in a dry state (dry adhesion), and an adhesive strength in a state impregnated with an electrolyte (wet adhesion), and to an electrochemical device including the same.

2. Description of the Related Art

Electrochemical devices such as lithium secondary batteries are generally primarily composed of a cathode, a separator, an anode, and/an electrolyte solution. Electrochemical devices are high-density energy storage devices capable of being charged and discharged through reversible conversion between chemical energy and electrical energy and are widely used in small electronic devices, such as mobile phones, laptop computers, and the like. Recently, applications of electrochemical devices have rapidly expanded to hybrid electric vehicles (HEVs), plug-in EVs, electric bicycles, and energy storage systems (ESSs) to deal with environmental problems, high oil prices, energy efficiency, and energy storage.

In the manufacture and use of such an electrochemical device, securing its safety is an important challenge. In particular, a separator made of a porous polymer substrate commonly used in an electrochemical device shows extreme heat shrinkage behavior in a high temperature or the like due to material characteristics and manufacturing process characteristics thereof, thereby causing an internal short circuit. Recently, in order to secure the safety of a lithium secondary battery, a separator having a porous organic/inorganic composite coating layer formed by applying a mixture of inorganic particles and a binder polymer on a porous polymer substrate has been developed.

In general, an electrode assembly is manufactured through a lamination process in which a separator and an electrode are bonded by heat and pressure, and the higher the heat and pressure applied in this process, the higher the binding force between the electrode and the separator. Recently, as the processing speed has been increased for the purpose of improving productivity, the time for which heat is applied to the separator is shortened. To secure sufficient adhesive strength such conditions, the pressure used in the process is increased. However, there is a problem in that the increased pressure causes the porous organic/inorganic composite coating layer to press the porous polymer substrate. In this case, the thickness of the porous polymer substrate is reduced, and the pore structure of the porous polymer substrate is deformed. In addition, when the inorganic particles in the porous coating layer locally agglomerate or form protrusions, the porous polymer substrate may be damage.

Therefore, there is a concern that the separator may be deteriorated in insulating performance.

On the other hand, when an electrode assembly is formed by laminating an electrode and a separator having a porous organic/inorganic composite coating layer, there is a high risk that the electrode and the separator may be separated due to insufficient adhesive strength, and in this case, inorganic particles deintercalated during the separation process may act as a local defect in the device. Accordingly, a separator in which an acrylic-based polymer binder is applied to a porous organic/inorganic composite coating layer to improve adhesive strength between an electrode and the separator has been proposed, and dry adhesive strength is improved when an acrylic-based polymer binder is used, but there is a problem in that the wet adhesive strength is reduced due to problems such as swelling or dissolution of the acrylic-based polymer binder by the electrolyte after application to the battery.

SUMMARY OF THE INVENTION

An objective of the present disclosure is to provide an electrochemical device separator exhibiting improved adhesive strength with respect to an electrode both in a dry state and a wet state and being capable of alleviating a problem in that the insulating performance thereof is deteriorated due to a reduction in the thickness of a porous polymer substrate and deformation of the pore structure thereof caused by high pressure applied during a process of laminating an electrode and a separator including a porous organic/inorganic composite coating layer on at least one side of a porous polymer substrate.

In addition, another objective of the present disclosure is to provide an electrochemical device separator having the above-described characteristics.

Other objectives and advantages of the present disclosure will be understood by the following description. On the other hand, it will be easily understood that the objects and advantages of the present disclosure can be realized by means or methods described in the claims and combinations thereof.

A first aspect of the present disclosure relates to an electrochemical device separator, wherein the electrochemical device separator includes a porous polymer substrate and a porous organic/inorganic composite coating layer at least one surface of the porous polymer substrate, in which the porous organic/inorganic composite coating layer includes particulate binder polymers, a non-particulate acrylic-containing polymer, and first inorganic particles, the particulate binder polymers include, hybrid polymer particles including a fluorine-containing polymer and an acrylic-containing polymer, and acrylic-containing polymer particles, the acrylic-containing polymer particles have a particle size D50 (a) in a range of 1 μm to 7 μm, the first inorganic particles have a particle size D50 (b) in a range of 200 nm to 800 nm, a/b is 2 to 15, and the particle size D50 of the hybrid polymer particles is 250 nm or less.

A second aspect of the present disclosure is that, in the first aspect, the particle size D50 (a) of the acrylic-containing polymer particles is in a range of 2 μm to 6 μm, and the particle size D50 (b) of the first inorganic particles is in a range of 300 nm to 700 nm, and a/b is 5 to 12.

A third aspect of the present disclosure is that, in the first or second aspect, the hybrid polymer particles have a particle size D50 in a range of 50 nm to 250 nm, more specifically, 100 nm to 200 nm.

A fourth aspect of the present disclosure is that, in any one of the first to third aspects, the hybrid polymer particles and the acrylic-containing polymer particles are mixed in a weight ratio of 8:2 to 2:8.

A fifth aspect of the present disclosure is that, in any one of the first to fourth aspects, the Tg of the acrylic-containing polymer included in the hybrid polymer particles is lower, by 10° C. or more, than the Tg of the acrylic-containing polymer included in the acrylic-containing polymer particles.

A sixth aspect of the present disclosure is that, in the fifth aspect, the Tg of the acrylic-containing polymer included in the hybrid polymer particles is in a range of 10° C. to 30° C., and the Tg of the acrylic-containing polymer included in the acrylic-containing polymer particles is in a range of 30° C. to 50° C.

A seventh aspect of the present disclosure is that, in any one of the first to sixth aspects, the fluorine-containing polymer includes at least one of a homopolymer of vinylidene fluoride, or a copolymer of vinylidene fluoride and at least one polymerizable monomer.

An eighth aspect of the present disclosure is that, in the seventh aspect, the monomer is at least one selected from the group consisting of tetrafluoroethylene, hexafluoropropylene, trifluoroethylene, chlorofluoroethylene, 1,2 difluoroethylene, perfluoro(methylvinyl) ether, perfluoro (ethylvinyl) ether, perfluoro (propylvinyl) ether, perfluoro (1,3 dioxole), perfluoro (2,2-dimethyl-1,3-dioxole), trichloroethylene, and vinyl fluoride.

A ninth aspect of the present disclosure is that, in the seventh aspect, the fluorine-containing polymer is a copolymer of vinylidene fluoride and hexafluoropropylene.

A tenth aspect of the present disclosure is that, in the seventh aspect, the at least one polymerizable monomer is present in a range of 1% to 20% by weight with respect to a weight of the copolymer.

An eleventh aspect of the present disclosure is that, in any one of the first to tenth aspects, the acrylic-containing polymer of the hybrid polymer particles and the acrylic-containing polymer of the acrylic-containing polymer particles each independently include alkyl (meth) acrylate repeating unit having an alkyl group having 1 to 18 carbon atoms.

A twelfth aspect of the present disclosure is that, in any one of the first to eleventh aspects, the non-particulate acrylic-containing polymer has a Tg of 0° C. or less.

A thirteenth aspect of the present disclosure is that, in any one of the first to twelfth aspects, the porous organic/inorganic composite coating layer further includes second inorganic particles different from the first inorganic particles, and the particle size D50 of the second inorganic particle is smaller than the first inorganic particles.

A fourteenth aspect of the present disclosure is that, in the thirteenth aspect, the particle diameter D50 of the second inorganic particle is in a range of 100 nm to 500 nm.

A fifteenth aspect of the present disclosure is that, in the thirteenth aspect, the first inorganic particle is alumina, and the second inorganic particle is boehmite.

A sixteenth aspect of the present disclosure is that, in any one of the first to fifteenth aspects, the porous organic/inorganic composite coating layer includes the particulate binder resin in an amount of 1% to 30% by weight with respect to the total weight of the porous organic/inorganic composite coating layer.

A seventeenth aspect of the present disclosure is that, in any one of the first to sixteenth aspects, the porous organic/inorganic composite coating layer is formed by coating and drying a slurry in which the particulate binder resins and inorganic particles are dispersed in an aqueous dispersion medium on at least one surface of a porous polymer substrate.

An eighteenth aspect of the present disclosure relates to an electrochemical device, in which the electrochemical device includes an anode, a cathode, and a separator interposed between the anode and the cathode, in which the separator is according to any one of the first to seventeenth aspects.

A nineteenth aspect of the present disclosure is that, in the eighteenth aspect, the electrochemical device is a lithium secondary battery.

The porous organic/inorganic composite coating layer of the separator, according to the present disclosure, includes acrylic-based polymer particles and first inorganic particles, in which the acrylic-based polymer particles have a particle size D50 (a) in a range of 1 to 7 μm, and the first inorganic particles has the particle size D50 (b) in a range of 200 to 800 nm, and a/b is 2 to 15. Since the particle size D50 of the acrylic-based polymer particles is larger, by more than twice than the particle size D50 of the first inorganic particles, it contributes that even when high pressure is applied during a lamination process with an electrode, inorganic particles of the porous organic/inorganic composite coating layer are less likely to cause damage to the porous polymer substrate and improves a thickness reduction of the porous polymer substrate, and a deformation of the pore structure.

In addition, the porous organic/inorganic composite coating layer of the separator, according to the present disclosure, includes hybrid polymer particles of a fluorine-based polymer and an acrylic-based polymer having a particle size D50 of 250 nm or less of the hybrid polymer particles. Since the fluorine-based polymer included in the hybrid polymer particles is insoluble in the electrolyte, the hybrid polymer particles retain their shape even if they are soaked in the electrolyte, even if the acrylic-based polymer is included at the same time. Accordingly, the separator of the present disclosure maintains the adhesive strength with the electrode without significantly losing the adhesive strength with the electrode, even in a wet state. In particular, when the particle size D50 of the hybrid polymer particles is smaller than 250 nm, the hybrid polymer particles easily move to the surface layer when the porous organic/inorganic composite coating layer is formed by coating and drying the slurry, thereby increasing the wet adhesive strength improvement effect. On the other hand, the acrylic-based polymer particles further contribute to maintaining the adhesive strength of the separator to the electrode in a dry state.

Meanwhile, the porous organic/inorganic composite coating layer of the separator, according to the present disclosure, includes a non-particulate acrylic-based polymer. The non-particulate acrylic-based polymer may improve the adhesive strength of the porous organic/inorganic composite coating layer to the electrode and the binding force between the inorganic particles and between the inorganic particles and the polymer substrate.

Accordingly, in the roll-to-roll continuous process of manufacturing an electrode assembly by laminating an electrode and the separator of the present disclosure, there is an effect of improving the dielectricity deterioration of the separator and improving the shape stability and processability of the electrode assembly. In addition, by manufacturing a battery using the electrode assembly including the separator, it is possible to maintain a high binding force between the separator and the electrode even in a state soaked with the electrolyte, thereby improving the interfacial resistance characteristics. In addition, since the binder polymer particles maintain high adhesive strength in a dry or wet state, the inorganic particles included in the porous organic/inorganic composite coating layer are not detached and are well fixed so that the morphological stability of the separator can be improved. Accordingly, there is an effect of improving the thermal stability and dielectric property of the battery.

BRIEF DESCRIPTION OF THE DRAWINGS

The accompanying drawings illustrate preferred embodiments of the disclosure and together with the detailed description, explain the principles of the disclosure, but the scope of the disclosure is not limited thereto. On the other hand, the shape, size, scale, or ratio of elements in the drawings included in this specification may be exaggerated to provide a clearer description.

FIG. 1 is a schematic diagram showing a cross-section of a separator according to a specific embodiment of the present disclosure; and FIG. 2 is a SEM image of the surface of the separator of Example 1 before the electrolyte impregnation.

DESCRIPTION OF THE PREFERRED EMBODIMENTS

Terms or words used in the specification and claims should not be construed as conventional or dictionary meanings but should be construed as meanings and concepts conforming to the technical idea of this invention based on the principle that the inventor can appropriately define the concept of terms to describe his invention in the best way. Therefore, since the configurations described in the embodiments described herein are only the most preferred embodiments of the present disclosure and do not represent all the technical ideas of the present disclosure, it should be understood that there may be various equivalents and modifications that may replace them at the time of the present application.

FIG. 1 is a schematic diagram showing a cross-section of a separator 10 for an electrochemical device according to a specific embodiment of the present disclosure.

In the present disclosure, a separator 10 includes a porous polymer substrate 1 and a porous organic/inorganic composite coating layer 3 formed on at least one side of the polymer substrate. Although FIG. 1 shows that the porous organic/inorganic composite coating layer 3 is formed on both sides surface of the polymer substrate 1, the porous organic/inorganic composite coating layer 3 may also be formed only on one side surface of the polymer substrate 1.

The porous organic/inorganic composite coating layer 3 includes particulate binder polymers 5 and 7 and first inorganic particles 9. The particulate binder polymers 5 and 7 include hybrid polymer particles 5 of a fluorine-based polymer and an acrylic-based polymer and acrylic-based polymer particles 7.

As shown in FIG. 1, the porous organic/inorganic composite coating layer 3 includes acrylic-based polymer particles 7 and first inorganic particles 9, and the particle size D50 (a) of the acrylic-based polymer particles 7 is in a range of 1 to 7 μm, the particle size D50 (b) of the first inorganic particles 9 is in a range of 200 to 800 nm, and a/b is in a range of 2 to 15.

Since the particle size D50 of the acrylic-based polymer particles 7 is at least two times larger than the particle size D50 of the first inorganic particles 9, it contributes that even when high pressure is applied during a lamination process with an electrode, inorganic particles of the porous organic/inorganic composite coating layer are less likely to cause damage to the porous polymer substrate and improves a thickness reduction of the porous polymer substrate, and a deformation of the pore structure. If a/b is less than 2, a compression resistance may not be sufficient, and if a/b exceeds 15, a resistance may be excessively high. When the particle size D50 (a) of the acrylic-based polymer particle 7 is less than 1 μm, there is a risk that the adhesive strength may be lowered, and when the particle size exceeds 7 μm, there may be a risk that the resistance may be excessively increased. When the particle size D50 (b) of the first inorganic particles 9 is less than 200 nm, the dispersibility in the slurry may be decreased, and when the particle size D50 (b) of the first inorganic particle 9 is more than 800 nm, the thickness of the porous organic/inorganic composite coating layer may be excessively increased or pores are excessively large. In this aspect, the particle size D50 (a) of the acrylic-based polymer particles may be 1 to 6 μm, more specifically 2 to 6 μm, and even more specifically, 3 to 5 μm. In addition, the particle size D50 (b) of the first inorganic particles may be in a range of 300 to 700 nm, more specifically, 400 to 600 nm, and a/b may be in a range of 3 to 13, more specifically, 5 to 12, and even more specifically, 6 to 11.

On the other hand, the acrylic-based polymer particles 7 also contribute to maintaining the adhesive strength of the separator to the electrode in a dry state.

In addition, the porous organic/inorganic composite coating layer 3 of the separator 10, according to the present disclosure, includes hybrid polymer particles 5 of a fluorine-based polymer and an acrylic-based polymer having a particle size D50 of 250 nm or less. Since the fluorine-based polymer included in the hybrid polymer particles 5 is insoluble in the electrolyte, the hybrid polymer particles 5 maintain their shape even when impregnated with the electrolyte even if the acrylic-based polymer is included at the same time. Accordingly, the separator 10 of the present disclosure maintains adhesive strength to the electrode without significantly losing adhesive strength to the electrode even in a wet state.

On the other hand, by adjusting the particle size D50 of the hybrid polymer particles 5 to 250 nm or less to facilitate movement to the surface layer during the coating layer formation process, as shown in FIG. 1, the porous organic/inorganic composite coating layer 3 has a heterogeneity of composition morphology in a thickness direction, in which the content ratio of hybrid polymer particles 5/acrylic-based polymer particles 7 present on a surface part opposite to the surface in contact with the polymer substrate is greater than the content ratio of hybrid polymer particle 5/acrylic-based polymer particles 7 present inside the porous organic/inorganic composite coating layer 3. Accordingly, the adhesive strength of the separator 10 to the electrode when wet with the electrolyte may be further improved. When the particle size D50 of the hybrid polymer particles 5 is 200 nm or less, the above-described movement effect on the surface layer becomes more pronounced. In this aspect, the particle size D50 of the hybrid polymer particles is in a range of 50 to 250 nm, more specifically, 100 to 200 nm.

As such, when the hybrid polymer particles 5 and/or acrylic-based polymer particles 7 have heterogeneity of the composition morphology of the above-described form in the thickness direction, the polymer particles 5 and 7 are more present on the surface part opposite to the surface in contact with the polymer substrate 1 than inside porous organic/inorganic composite coating layer 3. Therefore, due to the adhesive strength characteristics of the polymer particles present on the surface is large, the dry/wet adhesive strength to the electrode further increases. In addition, resistance to external stimuli such as peeling and scratching is increased, and the lamination characteristics of the electrode are improved. Accordingly, very excellent characteristics may be exhibited in a battery assembly process, such as winding and lamination. In addition, since the porosity is improved due to the inorganic particles that increase toward the inside, excellent ionic conductivity characteristics can be exhibited, thereby contributing to the improvement of battery performance.

In addition, the hybrid polymer particles and the acrylic-based polymer particles are mixed in a weight ratio of 8:2 to 2:8 but is not limited thereto.

In the specification of the present disclosure, "heterogeneity in composition morphology in a thickness direction, in which the content ratio of hybrid polymer particles/acrylic-based polymer particles present on the surface part opposite to the surface in contact with the polymer substrate is greater than the content of ratio hybrid polymer particles/acrylic-based polymer particles present inside the porous organic/inorganic composite coating layer", in which if the content ratio of hybrid polymer particles/acrylic-based polymer particles present on the surface part of the porous organic/inorganic composite coating layer opposite to the surface in contact with the polymer substrate is greater than the content ratio of hybrid polymer particles/acrylic-based polymer particles present under the surface part (inside) of the porous coating layer, it should be interpreted that any aspect is included. For example, it should be interpreted as a meaning including all of the porous coating layer formed so that the content ratio of the hybrid polymer particles/acrylic-based polymer particles decreases linearly from the surface of the porous coating layer to the porous substrate, formed so that the content ratio of the hybrid polymer particles/acrylic-based polymer particles non-linearly decreases from the surface of the porous coating layer to the porous substrate, and formed so that the content ratio of the hybrid polymer particles/acrylic-based polymer particles discontinuously decreases from the surface of the porous coating layer to the porous substrate, etc.

The porous organic/inorganic composite coating layer 3 may have the heterogeneity in composition morphology in a thickness direction, in which the content of hybrid polymer particles 5 present on a surface part opposite to the surface in contact with the polymer substrate 1 is greater than the content of hybrid polymer particles 5 present inside the porous organic/inorganic composite coating layer. In addition, the porous organic/inorganic composite coating layer 3 may have the heterogeneity of composition morphology in a thickness direction, in which the content of acrylic-based polymer particles 7 present on a surface part opposite to the surface in contact with the polymer substrate 1 is greater than the content of acrylic-based polymer particles 7 present inside the porous organic/inorganic composite coating layer.

Meanwhile, the porous organic/inorganic composite coating layer 3 of the separator, according to the present disclosure, includes a non-particulate acrylic-based polymer 8. The non-particulate acrylic-based polymer 8 may improve the adhesive strength of the porous organic/inorganic composite coating layer 3 to the electrode, between the inorganic particles 9 and between the inorganic particles 9 and the polymer substrate 1.

As described above, in the roll-to-roll continuous process of manufacturing an electrode assembly by laminating an electrode and the separator 10 of the present disclosure, there is an effect of improving the dielectricity deterioration of the separator 10, and improving the shape stability and processability of the electrode assembly. In addition, since a high binding force between the separator 10 and the electrode can be maintained even when a battery is manufactured using the electrode assembly including the separator 10, and soaked with an electrolyte, the interfacial resistance characteristic is improved. In addition, since the binder polymer particles 5 and 7 maintain high adhesive strength in dry or wet conditions, the inorganic particles 9 included in the porous organic/inorganic composite coating layer 3 are not detached and are well fixed. Therefore, the shape stability of the separation membrane 10 can be improved. Accordingly, there is an effect of improving the thermal stability and dielectric property of the battery.

According to a specific embodiment of the present disclosure, the porous polymer substrate 1 is capable of providing a movement path of lithium ions while preventing a short circuit by electrically insulating the anode and the cathode and may be used without particular limitation as long as it is generally used as a separator polymer substrate of an electrochemical device. As examples of the separator substrate, for example, a porous polymer film or nonwoven fabric including at least one of polymer resins among polyolefins such as polyethylene, polyethylene terephthalate, polybutylene terephthalate, polyacetal, polyamide, polycarbonate, polyimide, polyether ether ketone, polyether sulfone, polyphenylene oxide, polyphenylene sulfide, and polyethylene naphthalate can be used.

In the present disclosure, the thickness of the polymer substrate may be 3 to 50 μm. Although the range of the separator substrate is not particularly limited to the aforementioned range, if the thickness is too thin than the above-described lower limit, mechanical properties are lowered, and the separator may be easily damaged during the use of battery. Meanwhile, the pore size and porosity present in the separator substrate are also not particularly limited but may be 0.01 to 50 μm and 10 to 95 vol %, respectively.

The porous organic/inorganic composite coating layer 3 may be formed by mixing a plurality of inorganic particles 9, particulate binder polymers 5 and 7, and non-particulate acrylic-based polymer 8. Since the polymer substrate 1 is coated by the porous coating layer 3 including inorganic particles 9, heat resistance and mechanical properties of the separator 10 may be further improved. According to a preferred embodiment of the present disclosure, the porous organic/inorganic composite coating layer 3 is disposed on both sides of the polymer substrate 1. As described above, by forming the porous coating layer 3 on both sides of the porous substrate 1, the wet adhesive strength and dry adhesive strength between the cathode and the separator and between the anode and the separator can be improved.

The porous organic/inorganic composite coating layer 3 may have a microporous structure due to an interstitial volume between the constituent inorganic particles 9 and the particulate binder polymers 5 and 7. The inorganic particles 9 serve as a kind of spacer capable of maintaining the physical shape of the porous coating layer 3. The interstitial volume refers to a space limited by substantially being in surface contact with the particles of the inorganic particles 9 and the particulate binder polymers 5 and 7. In addition, since the inorganic particles 9 generally have characteristics that do not change their physical properties even at a high temperature of 200° C. or higher, the separator 10 has excellent heat resistance by the porous organic/inorganic composite coating layer 3. In the present disclosure, the porous organic/inorganic composite coating layer 3 may have a thickness in a range of 1 to 50 μm, 2 to 30 μm, or 2 to 20 μm with respect to what is formed on either side of the porous substrate 1.

In the present disclosure, particulate polymers 5 and 7 refer to binder polymers that are added to the dispersion medium in the form of particles to form the porous coating layer 3 and maintain the added particle shape after coating and drying and are distinguished from a "non-particulate" binder polymer defined as losing a particulate phase during drying and transforming into a film-like form when forming a coating layer, even if it is dissolved in a solvent or not dissolved in a solvent. That is, in the present disclosure, "particle" is defined as maintaining substantially the same shape of added particles, and the shape is usually circular particles but is not limited thereto. As such, since the polymer particles maintain a particulate form, they hardly penetrate into the pores of the porous polymer substrate, thereby contributing to improving the clogging of the pores of the polymer substrate.

In one embodiment of the present disclosure, the particulate binder polymers 5 and 7 may be present in an amount of about 90% by weight or more or about 99% by weight or more with respect to the binder components present in the porous coating layer 3. In the present specification, the particulate binder polymers 5 and 7 may be referred to as polymer particles, resin particles, or binder particles. The particulate binder polymers 5 and 7 form a porous coating layer 3 having a layered structure through the adhesion between the inorganic particles 9 and mutual adhesion between the inorganic particles 9 and the polymer substrate 1. The hybrid polymer particles 5 may be prepared to refer to, for example, WO 2020/263936, and may be integrated with the reference of the present disclosure.

The fluorine-based polymer included in the hybrid polymer particles, which is insoluble with an electrolyte, is a homopolymer of vinylidene fluoride, a copolymer of vinylidene fluoride and other polymerizable monomers, or a mixture of two or more thereof.

Vinylidene fluoride and other polymerizable monomers may include at least one selected from the group consisting of tetrafluoroethylene, hexafluoropropylene, trifluoroethylene, chlorofluoroethylene, 1,2 difluoroethylene, perfluoro (methylvinyl) ether, perfluoro (ethylvinyl) ether, perfluoro (propylvinyl) ether, perfluoro ((1,3 dioxole), perfluoro (2,2-dimethyl-1,3-dioxole), trichloroethylene, and vinyl fluoride, but are not limited thereto. In particular, the fluorine-based polymer may be a copolymer of vinylidene fluoride and hexafluoropropylene. The content of vinylidene fluoride and other polymerizable monomers may be 1% to 20% by weight of the copolymer but is not limited thereto.

In the present disclosure, the content of the comonomer in the PVDF-based polymer can be measured by 1H-NMR method using Varian 500 MHZ. For detailed measurement methods, refer to Journal of Materials Chemistry, 2012, 22, 341 or AMT-3412-0k. For the confirmation of the NMR spectrum, suitable equipment such as Bruker Avance III HD 700 MHZ NMR or Varian 500 MHZ NMR may be used.

The acrylic-based polymer constituting the hybrid polymer particles and the acrylic-based polymer constituting the acrylic-based polymer particles may each independently include an alkyl methacrylate repeating unit having an alkyl group having 1 to 18 carbon atoms but are not limited thereto.

In one embodiment of the present disclosure, the Tg of the acrylic-based polymer included in the hybrid polymer particles may be lower than the Tg of the acrylic-based polymer included in the acrylic-based polymer particles by 10° C. or more. The lower the Tg of the acrylic-based polymer, the better the adhesive strength, and thus the lower the Tg of the acrylic-based polymer included in the hybrid polymer particles, the higher the dry/wet adhesive strength of t the hybrid polymer particles to the electrodes.

More specifically, the Tg of the acrylic-based polymer included in the hybrid polymer particles may be 10° C. to 30° C., and the Tg of the acrylic-based polymer included in the acrylic-based polymer particles may be 30° C. to 50° C. Although the acrylic-based polymer included in the hybrid polymer particles has a low Tg, the particulate form even at room temperature due to the mixed fluorine-based polymer can be maintained. In addition, when the Tg of the acrylic-based polymer included in the acrylic-based polymer particles is selected to be higher than or equal to room temperature, the particle shape may be maintained at room temperature to express electrode adhesive strength during lamination with the electrode.

The acrylic-based polymer may have a glass transition temperature (Tg) of 40° C. or less.

More specifically, the acrylic-based polymer includes a carboxylic acid ester as a repeating unit and may preferably be a (meth)acrylate ester. Specific examples of such (meth) acrylic acid ester may include, for example, (meth)methyl acrylate, (meth)acrylate, n-propyl (meth)ethyl acrylate, i-propyl (meth)acrylate, n-butyl (meth)acrylate, i-butyl (meth)acrylate, n-amyl (meth)acrylate, i-amyl (meth)acrylate, hexyl (meth)acrylate, cyclohexyl (meth)acrylate, 2-ethylhexyl (meth)acrylate, n-Octyl (meth)acrylate, nonyl (meth)acrylate, decyl (meth)acrylate, hydroxymethyl (meth) acrylate, hydroxyethyl (meth)acrylate, ethylene glycol (meth)acrylate, ethylene glycol di(meth)acrylate, propylene glycol di(meth)acrylate, trimethylolpropane tri (meth)acrylate, pentaerythritol tetra(meth)acrylate, dipentaerythritol hexa (meth)acrylate, allyl (meth)acrylate, ethylene di(meth) acrylate, and the like, and may be at least one selected among them. Among these, at least one selected from methyl (meth)acrylate, ethyl (meth)acrylate, and 2-ethylhexyl (meth)acrylate is preferable, and methyl (meth)acrylate is particularly preferable.

The porous organic/inorganic composite coating layer may include the particulate binder polymer in an amount of 1% to 30% by weight with respect to the weight of the porous organic/inorganic composite coating layer but is not limited thereto.

The non-particulate acrylic-based polymer included in the porous organic/inorganic composite coating layer is an acrylic-based polymer that does not dissolve in an aqueous dispersion medium but does not maintain a particulate form, for example, an acrylic-based polymer having a low Tg of 0° C. or less. The non-particulate acrylic-based polymer may improve the adhesive strength of the porous organic/inorganic composite coating layer to the electrode and the binding force between the inorganic particles and between the inorganic particles and the polymer substrate. The non-particulate acrylic-based polymer may be added in an amount of 10% by weight or less with respect to the total weight of the binder polymer included in the porous organic/inorganic composite coating layer but is not limited thereto.

Meanwhile, the first inorganic particles included in the porous organic/inorganic composite coating layer are not particularly limited as long as they are electrochemically stable. That is, the inorganic particles are not particularly limited as long as oxidation and/or reduction reactions do not occur in the operating voltage range of the applied electrochemical device (e.g., 0 to 5 V based on Li/Li+). In particular, when first inorganic particles having an ion transport ability are used, performance can be improved by increasing ion conductivity in the electrochemical device. In addition, when inorganic particles having a high dielectric constant are used as the first inorganic particles, the ionic conductivity of the electrolyte may be improved by contributing to an increase in the degree of dissociation of an electrolyte salt, such as a lithium salt, in a liquid electrolyte.

For the above reasons, the first inorganic particles may include inorganic particles having a high dielectric constant of 5 or more or 10 or more, inorganic particles having lithium ion transport ability, or a mixture thereof. Non-limiting examples of inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT, where, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, Cao, ZnO, $ZrO_2$, $Y_2O_3$, alumina ($Al_2O_3$), boehmite, SiC, $TiO_2$, etc., alone or a mixture of two or more. In addition, when the above-described high dielectric constant inorganic particles and the inorganic particles having lithium ion transport ability are mixed, their synergistic effect may be doubled.

Non-limiting examples of the inorganic particles having the lithium ion transport ability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z$) $(PO_4)_3$, $0<x<2$, $0<y<1$, $0<z<3$), $(LiAlTiP)_xO_y$-based glass $(0<x<4, 0<y<13)$, such as, $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as, $Li_{3.25}Ge_{0.25}P_{0.75}S_4$, etc., lithium nitride ($Li_xN_y$, $0<x<4$, $0<y<2$), such as, $Li_3N$, $SiS_2$-based glass ($Li_xSi_yS_z$, $0<x<3$, $0<y<2$, $0<z<4$), such as, $Li_3PO_4$—$Li_2S$—$SiS_2$, $P_2S_5$-based glass ($Li_xP_yS_z$, $0<x<3$, $0<y<3$, $0<z<7$), such as, LiI—$Li_2S$—$P_2S_5$, etc., or a mixture thereof.

Meanwhile, the porous organic/inorganic composite coating layer may further include second inorganic particles having a particle size D50 smaller than the particle size D50 of the first inorganic particles and different from the first inorganic particles. By mixing these second inorganic particles, the packing density of the porous coating layer may be improved, thereby further improving heat resistance. In this aspect, the particle size D50 of the second inorganic particle may be in a range of 100 to 500 nm.

As the second inorganic particle, the above-described first inorganic particles may be used. In particular, alumina may be used as the first inorganic particles and boehmite may be used as the second inorganic particle.

In the porous organic/inorganic composite coating layer, the content ratio of the inorganic particles is determined in consideration of the thickness, pore size, and porosity of the finally prepared porous organic/inorganic composite coating layer, but the inorganic particles may be included in a range of 70% to 99% by weight with respect to 100% by weight of the porous coating layer based on the weight ratio. When the content of the inorganic particles is less than 70% by weight, heat resistance may be reduced. On the other hand, when the content of the inorganic particles is too large, the amount of the binder is relatively too small, and thus the adhesive strength of the porous coating layer may be degraded.

On the other hand, in one embodiment of the present disclosure, the separator, including the porous organic/inorganic composite coating layer, may be prepared by mixing binder particles and inorganic particles with an aqueous dispersion medium to prepare a slurry for forming a coating layer, and then coating the slurry on at least one side surface of a polymer substrate.

As the coating method, dip coating, die coating, roll coating, comma coating, or a mixture thereof may be used.

In one embodiment of the present disclosure, the aqueous dispersion medium may include at least one of water and an alcohol having 1 to 5 carbon atoms. For example, the aqueous dispersion medium may include a mixture of water and isopropyl alcohol. By using the aqueous dispersion medium in the above production method, the binder particles are dispersed while maintaining the particle shape in the aqueous dispersion medium without being dissolved in the dispersion medium. For this reason, the binder particles can maintain a particle state in the prepared porous organic/inorganic composite coating layer and do not enter the pores of the polymer substrate.

On the other hand, in one embodiment of the present disclosure, the slurry for forming the coating layer is preferably controlled so that the concentration of the solids, excluding the dispersion medium, is in the range of 20% to 50% by weight. It is advantageous to obtain a separator having a porous organic/inorganic composite coating layer having the heterogeneity in the composition morphology of the present disclosure by controlling the concentration of solid, the average particle diameter, and the content ratio of the injected binder particles within the above range.

On the other hand, the separator of this disclosure can be applied to an electrochemical device. The electrochemical device may include an anode and a cathode, and the separator may be interposed between the anode and the cathode. The electrochemical device includes all devices that perform an electrochemical reaction, and specific examples thereof include all kinds of primary cells, secondary cells, fuel cells, solar cells, or capacitors. In particular, a lithium ion secondary battery including a lithium metal secondary battery, a lithium ion secondary battery, a lithium polymer secondary battery, or a lithium ion polymer secondary battery among the secondary batteries, is preferable.

In a specific embodiment, according to the present disclosure, the electrochemical device may be manufactured according to a conventional method known in the art. According to an embodiment of the present disclosure, the electrochemical device may be configured by a method of interposing the above-described separator between the cathode and the anode.

That is, the separator prepared by the above-described method is interposed between the anode and the cathode and is manufactured as an electrode assembly by a lamination process in which heat and/or pressure are applied to bind the separator. In one embodiment of the present disclosure, the lamination process may be performed by a roll press device including a pair of pressure rollers. That is, an anode, a separator, and a cathode are sequentially stacked and put between the pressure rollers to achieve interlayer bonding. In this case, the lamination process may be performed by a method of hot pressing.

The electrochemical device may be manufactured by loading an electrode assembly assembled by laminating an anode, a separator, and a cathode in a battery case and then injecting an electrolyte.

In one embodiment of the present disclosure, the electrode is not particularly limited, and the electrode active material may be prepared in the form of being adhered to the electrode current collector according to a conventional method known in the art. As non-limiting examples of the cathode active material among the electrode active materials, conventional cathode active material that may be used in the cathode of conventional electrochemical device may be used, and in particular, lithium manganese oxide, lithium cobalt oxide, lithium nickel oxide, lithium iron oxide, or lithium intercalation material such as a composite oxide formed by a combination thereof is preferable.

As non-limiting examples of the anode active material, a conventional anode active material that may be used in the anode of a conventional electrochemical device may be used, and in particular, lithium metal or lithium alloy, lithium adsorption materials such as carbon, petroleum coke, activated carbon, graphite, or other carbons are preferable. As non-limiting examples of the cathode current collector include a foil made of aluminum, nickel, or a combination thereof, and non-limiting examples of the anode current collector include a foil made of copper, gold, nickel, or a copper alloy or a combination thereof. The electrolyte solution that can be used in the present disclosure is a salt having the same structure as $A^+B^-$, and $A^+$ includes ions formed of alkali metal cations such as $Li^+$, $Na^+$, $K^+$, or a combination thereof, or $B^-$ includes $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. In the electrolyte, the salt may be dissolved or dissociated in an organic solvent or an organic solvent consisting of a mixture thereof, including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), and gamma butyrolactone (γ-butyrolactone), but is not limited thereto.

The electrolyte injection may be performed at an appropriate stage in the battery manufacturing process according to the manufacturing process and required physical properties of the final product. That is, it may be applied before assembling the battery or in the final stage of assembling the battery. As a process for applying the electrode assembly of the present disclosure to a battery, in addition to the general process of winding, lamination, stack, and folding processes of a separator and an electrode, are possible.

Hereinafter, examples will be given to describe the present disclosure in detail. However, the embodiments according to the present disclosure may be modified in various other forms, and the scope of the present disclosure should not be construed as being limited to the embodiments described below. The embodiments of the present disclosure are provided to more completely explain the present disclosure to those of ordinary skilled in the art.

Comparative Example 1

8.2 parts by weight of hybrid polymer particles [Arkema, LBG4330LX, D50: 300 nm, hybrid polymer particles that a copolymer in which VDF and HFP are polymerized in a molar ratio of 95:5 and a copolymer of ethyl acrylate and methyl methacrylate (Tg 20° C.) are mixed in a weight ratio of 7:3], 8.2 parts by weight of acrylic-based polymer particles [D50: 5 μm, a copolymer of styrene and butyl acrylate (Tg 40° C.)], 80 parts by weight of inorganic particles ($Al_2O_3$, D50: 500 nm) were added to water and dispersed to prepare a dispersion (35% by weight of solid concentration) for forming a porous coating layer.

Next, prepare a polyethylene material separator substrate (porosity 40%, thickness 9 μm), apply the dispersion on both sides of the separator substrate by bar coating using a doctor blade, and then dry with hot air at 50° C. using a heat gun to form a porous coating layer having a thickness of 12 μm based on the thickness of one side.

Comparative Example 2

A porous coating layer was formed in the same manner as in Comparative Example 1, except that the content of the hybrid polymer particles was 10.2 parts by weight, the content of the acrylic-based polymer particles was 10.2 parts by weight, and the content of the inorganic particles was changed to 75 parts by weight to prepare a dispersion (35% by weight) for forming the porous coating layer.

Comparative Example 3

A porous coating layer was formed in the same manner as in Comparative Example 1, except that 0.9 parts by weight of a non-particulate acrylic-based polymer [Toyochem CSB130, particle diameter 150 nm, Tg −30° C.] were added to water based on the solid content.

Comparative Example 4

A porous coating layer was formed in the same manner as in Comparative Example 1, except that 80 parts by weight of the inorganic particles ($Al_2O_3$, D50: 500 nm) and boehmite (D50: 300 nm) were added at a weight ratio of 85:15, instead of 80 parts by weight of the inorganic particles ($Al_2O_3$, D50: 500 nm).

Comparative Example 5

A porous coating layer was formed in the same manner as in Comparative Example 1, except that a dispersion (35% by weight of solid concentration) for forming a porous coating layer was prepared by changing the content of the acrylic-based polymer particles to 16.4 parts by weight without adding the hybrid polymer particles.

Comparative Example 6

A porous coating layer was formed in the same manner as in Comparative Example 1, except that a dispersion (35% by weight of solid concentration) for forming a porous coating layer was prepared by changing the content of the hybrid polymer particles to 16.4 parts by weight without adding acrylic-based polymer particles.

Comparative Example 7

A porous coating layer was formed in the same manner as in Comparative Example 1, except that 8.2 parts by weight of acrylic-based polymer particles having a small particle size D50 [copolymer of styrene and butyl acrylate (Tg 40° C.) (D50: 0.9 μm)] were added instead of 8.2 parts by weight of the acrylic-based polymer particles having a D50 of 5 μm of Example 1.

Example 1

A porous coating layer was formed in the same manner as in Comparative Example 3, except that hybrid polymer particles [Arkema, KYNAR AQUATEC CRX, D50: 15 nm, hybrid polymer particles that a copolymer in which VDF and HFP are polymerized in a molar ratio of 95:5 and a copolymer of ethyl acrylate and methyl methacrylate (Tg 20° C.) are mixed in a weight ratio of 7:3] were used instead of hybrid polymer particles [Arkema, LBG4330LX, D50: 300 nm, hybrid polymer particles that a copolymer in which VDF and HFP are polymerized in a molar ratio of 95:5 and a copolymer of ethyl acrylate and methyl methacrylate (Tg 20° C.) are mixed in a weight ratio of 7:3].

FIG. 2 is a SEM image of the surface of the separator of Example 1 before the electrolyte impregnation.

Example 2

A porous coating layer was formed in the same manner as in Comparative Example 3, except that hybrid polymer particles [Arkema, D50: 200 nm, hybrid polymer particles that a copolymer in which VDF and HFP are polymerized in a molar ratio of 95:5 and a copolymer of ethyl acrylate and methyl methacrylate (Tg 20° C.) are mixed in a weight ratio of 7:3] were used instead of hybrid polymer particles [Arkema, LBG4330LX, D50: 300 nm, hybrid polymer particles that a copolymer in which VDF and HFP are polymerized in a molar ratio of 95:5 and a copolymer of ethyl acrylate and methyl methacrylate (Tg 20° C.) are mixed in a weight ratio of 7:3].

Example 3

A porous coating layer was formed in the same manner as in Example 1, except that the content of the hybrid polymer particles was 10.2 parts by weight, the content of the acrylic-based polymer particles was 10.2 parts by weight, and the content of the inorganic particles was changed to 75 parts by weight to prepare a dispersion (solid content 35% by weight) for forming the porous coating layer.

Example 4

A porous coating layer was formed in the same manner as in Example 1, except that 80 parts by weight of the inorganic particles ($Al_2O_3$, D50: 500 nm) and boehmite (D50: 300 nm)) were added at a weight ratio of 85:15, instead of 80 parts by weight of the inorganic particles ($Al_2O_3$, D50: 500 nm).

Measurement of Average Particle Diameter D50

D50 can be defined as the particle size based on 50% of the particle size distribution and was measured using a laser diffraction method.

Measurement of Tg

Using DSC, the Tg of a 25 mg sample was measured in a nitrogen atmosphere under conditions of a temperature increase rate of 10° C./min in a range of room temperature to 300° C.

Wet Adhesion Specimen Production

The separator and the cathode obtained in each of Examples and Comparative Examples were laminated, impregnated in 1.0 g of the electrolyte (content ratio of ethylene carbonate:ethyl methyl carbonate=7:3, $LiPF_6$ 1 M), and left at room temperature for 24 hours. Thereafter, a specimen was prepared by lamination using a hot press. At this time, the pressurization was performed at 70° C. and 5 kgf for 5 minutes. The size of the specimen was 2 cm×6 cm.

The cathode was prepared as follows. $LiNi_{0.8}Co_{0.1}Mn_{0.1}O_2$, PVdF, and carbon black were mixed in a weight ratio of 97.0:1.5:1.5 and dispersed in 2-methyl-2-pyrrolidone to prepare a cathode slurry, coated on an aluminum current collector, and then dried and press-rolled to prepare a cathode.

Dry Adhesion Specimen Production

The separator and the anode obtained in each Examples and Comparative Examples were laminated using a hot press to prepare a specimen. At this time, the pressurization was performed at 60° C. and 6.5 MPa for 1 second. The size of the specimen was 2.5 cm×6 cm.

The anode was prepared as follows. Graphite, SBR, and CMC were mixed in a weight ratio of 89.2:10:0.8 and dispersed in distilled water to prepare an anode slurry, coated on a copper current collector, and dried and press-rolled to prepare an anode.

Measurement of Adhesive Strength with Electrodes

Wet adhesive strength and dry adhesive strength of the separator were evaluated using each specimen prepared above, and the results are summarized in Table 1 below. After each specimen was prepared, the adhesive strength was measured after leaving the specimens at room temperature for 1 hour. Adhesive strength was measured by peeling at an angle of 180° for dry and 90° for wet using a tensile tester (UTM equipment).

TABLE 1

|  | Comparative Example 1 | Comparative Example 2 | Comparative Example 3 | Comparative Example 4 | Comparative Example 5 | Comparative Example 6 | Comparative Example 7 | Example 1 | Example 2 | Example 3 | Example 4 |
|---|---|---|---|---|---|---|---|---|---|---|---|
| Wet adhesive strength (gf/20 mm) | 15 | 20 | 18 | 25 | 0 | 30 | 20 | 35 | 30 | 35 | 35 |
| Dry adhesive strength (gf/20 mm) | 35 | 55 | 40 | 40 | 60 | 5 | 45 | 50 | 45 | 60 | 50 |
| Thickness reduction ratio after hot-press (%) | 20 | 10 | 20 | 15 | 8 | 12 | 50 | 20 | 20 | 15 | 10 |

As can be seen in Table 1, in Comparative Example 5, dry adhesive strength is high but wet adhesion is low, so when applied to an actual battery, battery performance may deteriorate. Comparative Example 6 has a problem in that the adhesive strength is lowered during the electrode assembly manufacturing process due to low dry adhesive strength. Comparative Example 7 has low compression resistance, so the thickness of the porous polymer substrate may decrease due to the high pressure applied when laminating the separator and the electrode, and thus the insulation of the separator may be deteriorated, such as the deformation of the pore structure.

On the other hand, the separators according to Comparative Examples 1 to 4 have both wet and dry adhesive strength at a good level, but the separators according to Examples 1 to 4 have a good dry adhesive strength and have a better wet adhesive strength than the separators of Comparative Examples 1 to 4. Accordingly, excellent electrochemical effects may be exhibited during the electrode assembly manufacturing process and battery driving.

What is claimed is:

1. A separator for an electrochemical device, the separator comprising a porous polymer substrate and a porous organic/inorganic composite coating layer formed on at least one side of the polymer substrate, wherein the porous organic/inorganic composite coating layer comprises particulate binder polymers and first inorganic particles,
    the particulate binder polymers comprise hybrid polymer particles of a fluorine-based polymer and an acrylic-based polymer and acrylic-based polymer particles,
    the porous organic/inorganic composite coating layer comprises a non-particulate acrylic-based polymer,
    the acrylic-based polymer particles have a particle size D50 "a" in a range of 1 μm to 7 μm,
    the first inorganic particles have a particle size D50 "b" in a range of 200 to 800 nm,
    a/b is in a range of 2 to 15, and
    hybrid polymer particles have a particle size D50 of 250 nm or less.

2. The separator of claim 1, wherein the acrylic-based polymer particle has a particle size D50 "a" in a range of 2 to 6 μm,
    the first inorganic particles have a particle size D50 "b" in a range of 300 to 700 nm, and
    a/b is in a range of 5 to 12.

3. The separator of claim 1, wherein the hybrid polymer particles have a particle size D50 in a range of 50 to 250 nm.

4. The separator of claim 1, wherein the hybrid polymer particles have a particle size D50 in a range of 100 to 200 nm.

5. The separator of claim 1, wherein the hybrid polymer particles and the acrylic-based polymer particles are mixed in a weight ratio of 8:2 to 2:8.

6. The separator of claim 1, wherein a glass transition temperature Tg of the acrylic-based polymer comprised in the hybrid polymer particles is lower than that of the acrylic-based polymer comprised in the acrylic-based polymer particles by 10° C. or more.

7. The separator of claim 6, wherein the acrylic-based polymer comprised in the hybrid polymer particle has a Tg in a range of 10° C. to 30° C., and the acrylic-based polymer comprised in the acrylic-based polymer particle has a Tg in a range of 30° C. to 50° C.

8. The separator of claim 1, wherein the fluorine-based polymer is a homopolymer of vinylidene fluoride, a copolymer of vinylidene fluoride and other polymerizable monomers, or a mixture of two or more thereof.

9. The separator of claim 8, wherein the monomer comprises at least one selected from the group consisting of tetrafluoroethylene, hexafluoropropylene, trifluoroethylene, chlorofluoroethylene, 1,2-difluoroethylene, perfluoro (methylvinyl) ether, perfluoro(ethylvinyl)ether, perfluoro(propylvinyl)ether, perfluoro(1,3 dioxole), perfluoro(2,2-dimethyl-1,3-dioxole), trichloroethylene, and vinyl fluoride.

10. The separator of claim 8, wherein the fluorine-based polymer is a copolymer of vinylidene fluoride and hexafluoropropylene.

11. The separator of claim 8, wherein the monomer is contained in a range of 1% to 20% by weight with respect to the weight of the copolymer.

12. The separator of claim 1, wherein the acrylic-based polymer constituting the hybrid polymer particle and the acrylic-based polymer constituting the acrylic-based polymer particles each independently comprise an alkyl (meth) acrylate repeating unit having an alkyl group having 1 to 18 carbon atoms.

13. The separator of claim 1, wherein the non-particulate acrylic-based polymer has a Tg of 0° C. or less.

14. The separator of claim 1, wherein the porous organic/inorganic composite coating layer comprises second inorganic particles different from the first inorganic particles, and the second inorganic particles have a particle size D50 smaller than that of the first inorganic particles.

15. The separator of claim 14, wherein the second inorganic particle has a particle size D50 in a range of 100 to 500 nm.

16. The separator of claim 14, wherein the first inorganic particle is alumina and the second inorganic particle is boehmite.

17. The separator of claim 1, wherein the porous organic/inorganic composite coating layer comprises the particulate binder polymer in an amount of 1% to 30% by weight with respect to the total weight of the porous organic/inorganic composite coating layer.

18. The separator of claim 1, wherein the porous organic/inorganic composite coating layer is formed by coating and drying a slurry, wherein the particulate binder polymers and inorganic particles are dispersed in an aqueous dispersion medium on at least one surface of a porous polymer substrate.

19. An electrochemical device, comprising:
    an anode,
    a cathode, and
    a separator interposed between the anode and the cathode, wherein the separator is according to claim 1.

20. The separator of claim 19, wherein the electrochemical device is a lithium secondary battery.

* * * * *